INVENTOR.
JACQUES L. RICARD
BY
Lothrop & West
ATTORNEYS

United States Patent Office 3,424,655
Patented Jan. 28, 1969

3,424,655
MUTANT DETECTION DEVICE
Jacques L. Ricard, Sacramento, Calif., assignor of forty percent to Martin C. Baer, Placerville, Calif.
Original application Oct. 8, 1962, Ser. No. 228,865, now Patent No. 3,255,095, dated June 7, 1966. Divided and this application Apr. 9, 1965, Ser. No. 456,876
U.S. Cl. 195—127        2 Claims
Int. Cl. C12k 1/10

ABSTRACT OF THE DISCLOSURE

Adjacent a conventional fraction collector having a plurality of culture tubes is a vessel containing a liquid culture medium in which is growing a large population of selected microorganisms undergoing mutation. Predetermined quantities of the culture medium are successively withdrawn from the vessel and mixed with predetermined amounts of a selective medium, the mixtures being introduced into successive culture tubes for incubation. The selective medium is chosen to provide an environment which allows a desired mutant to develop a sizeable progeny while the non-mutants deteriorate, the selective medium having characteristics capable of being altered by the desired mutant but not by the non-mutants.

---

This is a division of application Ser. No. 228,865 filed Oct. 8, 1962, now issued as Patent No. 3,255,095 dated June 7, 1966.

The invention relates to microbiological apparatus and, more particularly, to a device for and method of selecting desired strains of microorganisms.

For convenience of terminology, the device of the invention will be called a "mutector," this being a coined word derived from the words "mutant detector."

In suitable environments, all biological processes take place at different rates, and to various extents, depending upon the kind and amount of enzymes present in the individual cells. Therefore, the same basic ingredients, carbohydrates, fatty acids, amino acids, vitamins and minerals, result in forms as varied as a cow, a yeast cell or an apple tree.

Such differentiation has resulted in the systematic selection by man of organisms able to produce, or particularly effective in the production of, certain valuable end products. Specialized breeds of animals and varieties of plants have been selected for agricultural purposes. In industrial fermentation or biological research, more efficient or specialized microbial strains are continuously sought, for example, very recently, L-threonine producers were sought among microorganisms and also some that could produce fumaric acid in concentrations greater than 3.5 to 4% of the surrounding medium.

These specialized strains are very often the result of mutations taking place in large populations. These mutations result in the occurence of individuals different in one aspect or another from their parents through an "error" in the duplication of chromosomes. The organisms which have undergone a mutation, as well as their descendants, are known as mutants.

The majority of mutants are auxotrophs, in that they have lost some of the anzymatic characteristics of their parents, sometimes to such an extent that they cannot survive in their "home" environment. However, a few mutants are prototrophs, in the sense that they have a broader, or more efficient enzyme make-up than their parents. These prototrophic mutants often have practical advantages. The selection and use of mutants, for example, has allowed spectacular increases in the effectiveness of penicillin production.

The kind of mutants which arises in a population cannot be controlled; however, the frequency at which mutation occurs can be stimulated with appropriate physical or chemical means.

The main task in obtaining a microbial mutant possessing a desired characteristic is often the identification of the desired organism within the vast population surrounding it.

This identification has heretofore been achieved through various techniques involving systematic, tedious plating (inoculation of microorganisms on semi-solid culture media contained in plates), these techniques permitting the handling of only relatively small populations in terms of mutation rates.

It is therefore an object of the invention to decrease substantially the time and effort required for the selection of a desirable mutant.

It is another object of the invention to detect continuously and automatically, in a very large population, the presence of a desired mutant, which can thereafter be singled out by standard techniques from a small population.

It is a further object of the invention to provide a generally improved mutant detecting device.

Other objects, together with the foregoing, are attained in the embodiment described in the following description and shown in the accompanying drawings in which.

Figure 1:
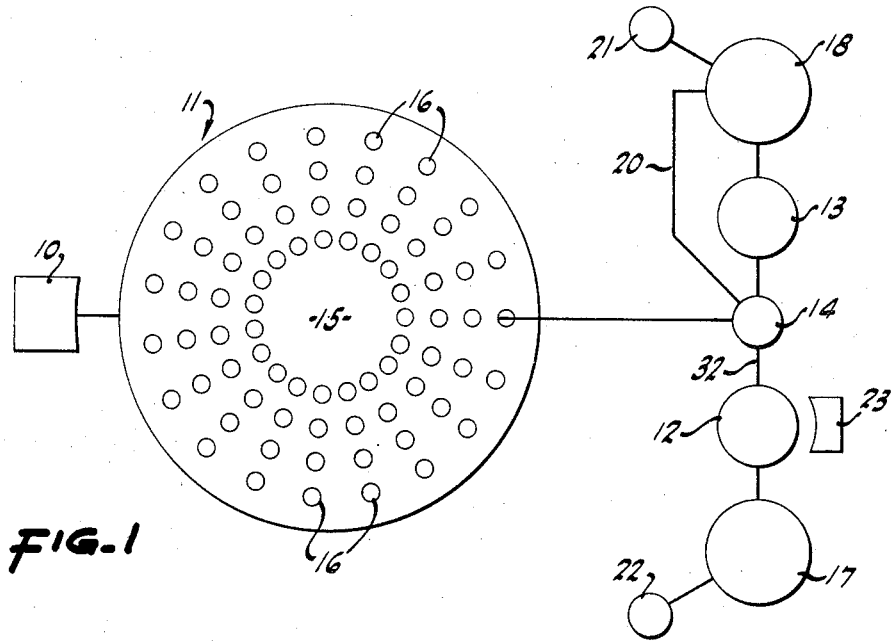
FIG. 1 is a diagrammatic representation of the major components of the mutector.

The "mutector," generally designated by the reference numeral 11, comprises a pair of continuous culture units 12 and 13 equipped with appropriate accessories well-known in the art, enabling them to operate on the "chemostat" or "turbidostat" principle. Effluent from the culture units is selectively directed into a receiver and funnel unit 14 which, in turn, is connected to a rotatable fraction collector 15 of conventional reel construction. Disposed within the reel is a plurality of tubes 16, for example, 300 tubes of 15 x 150 mm. size. A timer 10 suitably attached to the collector 15 regulates the speed of rotation of the collector.

A pair of containers 17 and 18 serves to supply various selected nutrinet media, or substrates, to the units 12 and 13, respectively. The container 18 is additionally connected to the receiver and funnel unit 14 through the line 20 and is therefore capable of providing selective medium as desired. Appropriate flow controlling devices, such as a pair of Mariotte tubes 21 and 22 provide for pressure regulation in the containers 18 and 17, respectively. Located adjacent the culture unit 12 is an ultra-violet light source 23 adapted to accelerate the mutation rate in unit 12.

The whole unit is of a compact design to allow encasing in a transparent plastic box for aseptic operation following gas sterilization when needed.

The purpose of the continuous culture unit 12 is to develop very large microorganism populations including substantial numbers of mutants. The function of the tubes 16 in the fraction collector 15, on the other hand, is to provide a selective environment allowing the desired mutant to develop a sizable progeny while the non-mutants deteriorate.

The relatively large number of tubes 16 on the fraction collector rack is such that an incubation period is provided for each individual tube, thus allowing time for the effects resulting from the presence of the desired mutant to take place. These effects are usually detectable by unaided visual observation of a kind varying with the characteristics of the mutant, as is described in detail in the examples later set forth.

In order to assist in a full understanding of the device and its manner of use, it is believed that a short discussion of its theory is in order at this juncture.

It is generally recognized among scientists that the potential characteristics of an individual are inherited, while the extent to which these characteristics are developed depends upon the environment. In the case of microbial mutants, a newly acquired characteristic can manifest itself readily only when it results in a more effective adaptation of the individual to the environment. Then, the mutant has an advantage over the rest of the population, is capable of multiplying at an accelerated rate, depending upon the environment, and it develops a progeny possessing the new characteristic.

On the other hand, if a new characteristic of the mutant does not result in an exclusive or superior multiplication rate, the mutant is likely to remain undetected. In the case of the prototroph, the competition with normal cells, at least in a normal environment, is likely to prove too much of a struggle.

A general rule for microorganisms, "the specialization law," seems to obtain in this situation, the rule stating that the rate of growth is inversely proportional to the diversity of the enzyme make-up. An example of this is the much faster rate of growth of a virus having a narrow enzyme make-up, as contrasted to the rate of growth of the average chemolithotroph bacterium with its broad enzyme spectrum.

The mutector device, being based on the foregoing theory, not only provides conditions where mutants will occur in significant numbers, but also provide a sudden change in the environment of small but numerous segments of the population so that mutants with the desired characteristics become suddenly better adapted than the normal cells. This provides the mutants with an opportunity to develop a progeny, this progeny effecting the substrate and thereby revealing their presence.

Quantitative adjustments of the mutector require some understanding of the mutation rates in microorganisms. The rate of natural mutation averages $1 \times 10^{-9}$ for bacteria; that is, one mutant is found on the overall average among each one billion cells. The rate of prototrophic mutation is admittedly difficult to evaluate since all possible prototrophic characteristics cannot be identified readily. However, some insight into this question has been achieved in the field of bacterial genetics from the rate of reversion back to the normal type in a population of auxotrophs. This was found to be about $1 \times 10^{-6}$ or one prototroph per one million mutants. These rates can be increased considerably when the population is exposed to such mutagenic agents as ultra violet light, nitrogen mustard gas or radioactive materials.

The effluent flow from the continuous culture apparatus must therefore be adjusted so that at least one prototroph is delivered to each tube 16 of the fraction collector 15 when an organism with a broader enzyme make-up than the parent cells is sought. In addition to the continuous culture portion, the tube received a relatively large amount of a medium designed to provide that environment required for the desired prototroph to prosper.

Example I.—Identification of a prototrophic mutant

The mutector is used here to obtain an organism able to decompose a relatively stable compound such as an herbicide, insecticide, cumbersome waste material, or complex molecule the structure of which is unknown, the latter case involving identification by relating the unknown complex molecule with known compounds through the application of the "simultaneous adaptation" theory.

This application requires the operation of only one of the continuous culture units and the fraction collector 15.

A specific illustration would be the search for an organism able to utilize the structurally unknown compound obtained through the ammoniation of pyrogallol.

The first step is the selection of the more suitable continuous culture system. Since background information provides some indication that the combination of ammonia nitrogen with the pyrogallol is significant in the outstanding stability of the nitrogen moiety in the resulting complex to microbial action, it is an advantage to grow the normal microbial population in an environment short of nitrogen, so that the nitrogen is likely to be removed first from the complex. Therefore, the continuous culture apparatus would be operated on the chemostat principle. The mutagenic population would be grown in a general purpose medium with nitrogen as the limiting factor. The inoculum would be a common soil-mixed, or soil-run, microbial population. The medium would contain the usual amounts of mineral salts and energy source, with the nitrogen concentration adjusted downwardly. A nitrogen concentration of 0.18 mg. per ml. would correspond to a maximum population density of about $35 \times 10^9$ microbial cells per ml.

The second step is the determination of the volume of effluent to be allowed in each tube of the fraction collector. If the capacity of the test tubes used is 20 ml. and the continuous culture vessel has a capacity of 500 ml. with a mutation rate of $1.81 \times 10^{-5}$ (e.g. that of *Phytomonas stewartii*, which is somewhat above average for natural mutation rate, but rather low for U.V. light stimulated mutations and therefore fairly representative of a convenient mutation rate) and the division cycle requires about 20 minutes, the following calculations indicate approximately the volume of effluent required per tube:

(1) the microbial population in the continuous culture vessel is about $35 \times 10^9$ per ml. or $1.75 \times 10^{13}$ for the whole vessel.

(2) In this population $1.81 \times 10^{-5}$ would be mutants, so that during each division cycle time $(1.75 \times 10^{13})$ $(1.81 \times 10^{-5}) = 3.17 \times 10^8$ mutants appear.

(3) The number of prototrophs present in the population is then $(3.17 \times 10^8)$ $(10^{-6}) = 3.17 \times 10^2$ or 317 in 500 ml. or 0.6 prototroph per ml.

(4) Therefore 5 ml. of continuous culture effluent drawn every 20 minutes would contain about three prototrophs under these conditions.

Delivery of this amount to each of the tubes is achieved readily by the proper adjustment of the flow of fresh medium into the continuous culture vessel and the setting of the fraction collector motion on the timer 10 set for operation at 20 minute intervals.

The new environment for the small population segment in each of the tubes is provided by the synchronized delivery of 15 ml. ammoniated pyrogallol suspension to each tube from the container 18 through the operation of an appropriate valve 26 synchronized with the fraction collector timer 10. Every tube 16, then, receives 5 ml. from the continuous culture vessel 12 and 15 ml. of the ammoniated pyrogallol suspension from the container 18. Minor adjustments in the volume of selective medium delivered can be made in any appropriate manner, as by changing the size of the orifice of a terminal nozzle 31 on the supply line 20.

Figure 2:
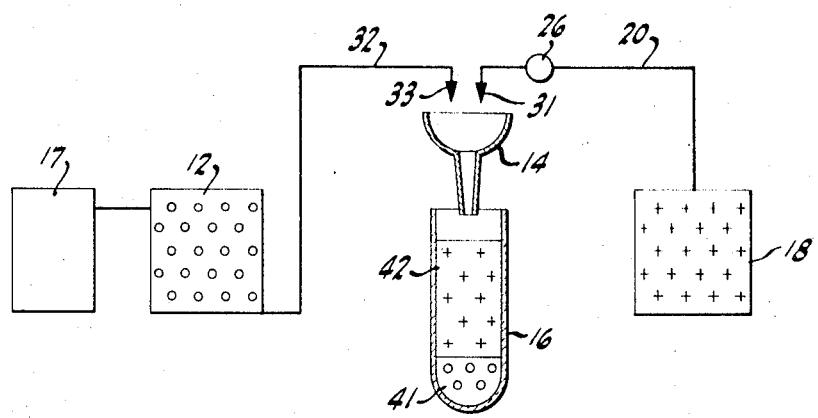
FIG. 2 is a diagrammatic representation of a mutector tube, showing the source of its two fractions and the flow control accessories.

As appears most clearly in FIG 2, the container 17 supplies an appropriate nutrient medium to support the population in the continuous cluture unit 12, the unit 12 also, therefore, serving as a source of mutants. The container 18, on the other hand, supplies the selective medium, in this case ammoniated pyrogallol. The receiver and mixing funnel unit 14 collects the effluent from the culture unit 12 and the container 18 and directs the mixture to the proper one of the tubes 16 in the fraction collector. The line 32 from culture unit 12 drips slowly and continuously through the orifice 33 when the unit 12 is operated on the chemostat principle, whereas the line 20 from the container 18 flows only for a short period of time but at a relatively high flow rate. The valve 26, preferably of the solenoid type and synchronized with the timer 10, controls the opening and closing of the line 20 at the appropriate junctures.

With particular reference to the tube 16 shown in FIG. 2, it can be seen that in the bottom portion of the tube the 5 ml. of cell suspension, containing such mutants as there may be, is indicated by a plurality of circles and by the reference numeral 41. Above this, in the tube, shown by crosses and indicated by the reference numeral 42 is the 15 ml. of selective medium, ammoniated pyrogallol in this example.

The ammoniated pyrogallol is the sole source of nitrogen to the organisms delivered to each tube since nitrogen is the limiting factor in the continuous culture unit while small amounts of carbon and mineral salts are delivered with the mutagenic population sample. A five day incubation period is allowed each tube during continuous operation, since the usual fraction collector rack holds 300 of these tubes and one is filled every 20 minutes.

Any appreciable growth in the tubes is presumptive evidence that some breakdown of the ammoniated pyrogallol has taken place. Under actual operation growth began to appear on the sufrace of some tubes before the end of the third day.

Further selection can be achieved by repeating the whole operation in similar fashion, but using the newly identified mutant to inoculate the continuous culture vessel.

Example II.—Identification of poison tolerant mutant

In this case, one continuous culture unit and the fraction collector are required. The mutector is used here to obtain an organism able to remain active in a medium containing a concentration of desired end product, toxic to the normal population.

Figure 3:
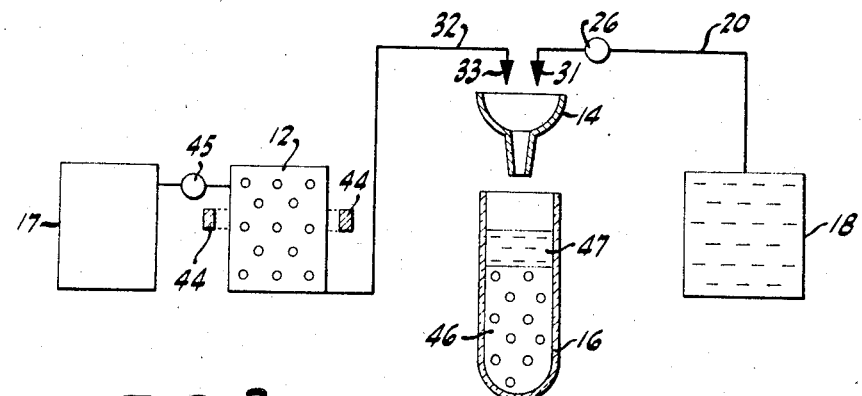
FIG. 3 is a showing comparable to that of FIG. 2 but with variant flow controls and accessories.

The search for a yeast mutant able to remain active until the ethanol concentration reaches 16% is used here as an illustration. Yeasts usually no longer prosper in a medium where the ethanol concentration has reached 13 or 14% by volume. A large yeast population is grown in the continuous culture apparatus operating on the Turbidostat principle in this instance, as can be seen by reference to FIG. 3, wherein a photo-electric cell 44 controls the flow of fresh medium from the container 17 through activation of a solenoid valve 45. A plentiful air circulation is maintained in the mutagenic population in order to obtain maximum cell multiplication rate and minimum ethanol production. When the culture in the unit 12 has reached the 70 to 80% level of the maximum population density allowed by the nutrient concentration in the medium, a 15 ml. portion, designated by the numeral 46, is released to one tube 16 of the fraction collector, while a 3.1 ml. aliquot of 95% ethanol, designated by the numeral 47, is delivered into the same tube from the container 18. This concentration of alcohol will inhibit a normal yeast population resulting in a clearing of the tube cloudiness, while a mutant unaffected by this concentration of alcohol will multiply and result in a continued and increased cloudiness of the tube contents, as well as further carbon dioxide formation.

Example III.—Symbiosis

The mutector is used here to identify a mutant able to grow symbiotically with other organisms.

An illustration of this would be the attempt to identify a Rhizobium mutant able to grow symbiotically, fixing atmospheric nitrogen on barley roots, thereby eliminating the need for nitrogen fertilization in soils cropped to barley.

Figure 5:
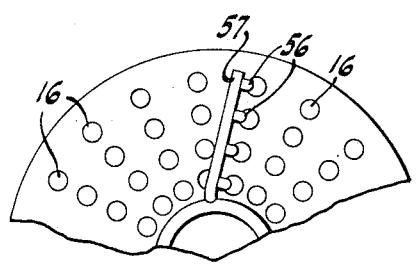
FIG. 5 is a fragmentary plan view of the fraction collector reel under the arrangement of FIG. 4.
Figure 4:
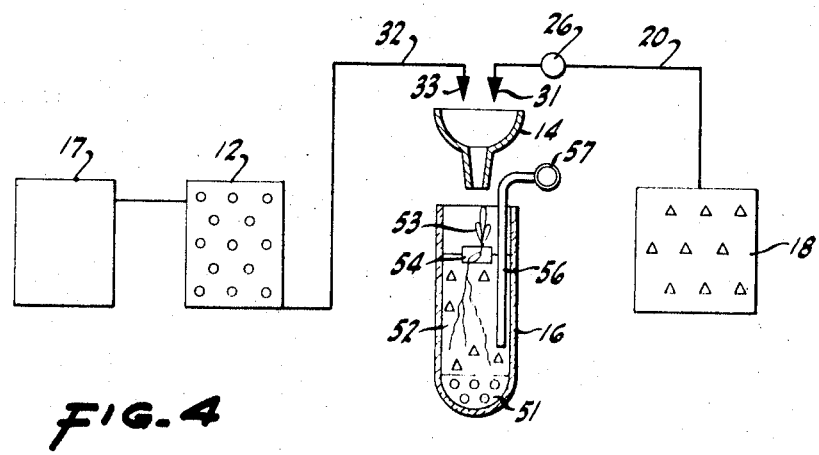
FIG. 4 is also comparable to FIG. 2 but with variant components.

As is shown most clearly in FIG. 4, the continuous culture unit would be operated on the Chemostat principle with nitrogen as the limiting factor in a stardard mannitol broth medium. The inoculum is a mixture of many strains of Rhizobia. The effluent flow would be adjusted to about 5 ml. per tube 16 on the fraction collector, the charge being indicated by the reference numeral 51. In addition, 12 ml. of nitrogen-free Hoagland solution, designated by the reference numeral 52 is delivered to each tube from the container 18. A two-day old barley seedling, 53, germinated in the usual fashion for solution culture and encased in a pea size pellet 54 of foam plastic would then be also added to the tube (FIG. 4). Air is bubbled through the tube 56 to aerate the roots of the seedling, details being shown in FIGS. 4 and 5 wherein a header 57 supplies a plurality of the capillary tubes 56.

The seedlings 53 would show the usual sign of nitrogen starvation unless nitrogen is supplied to them by some Rhizobium mutant. The occurrence of such organism could be pointed out further by nodules on the root system of the seedling. Incubation can be carried out for seven days on the fraction collector rack and extended to one month on a static rack until the seedlings develop unmistakable nitrogen starvation symptoms.

It is believed to be a matter of considerable interest in this connection that recently, in Australia, there has been found a nitrogen fixing microorganism growing symbiotically with a grass plant whereas heretofore the only known occurrences were in the legumes.

Example IV.—Antibiosis

Figure 6:
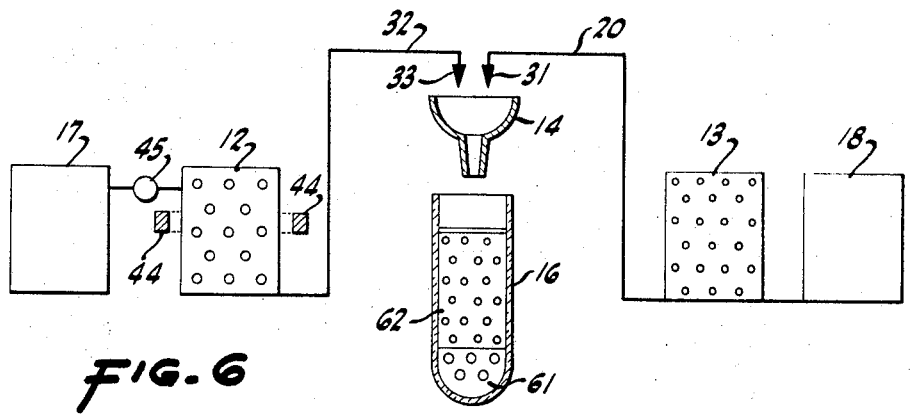
FIG. 6 is a view comparable to that of FIG. 3, but with modifications.

The mutector here selects, from a mutagenic population, a mutant producing a substance adversely affecting bacteria, named here "test organisms." The mutant may be sought among a bacterial, yeast, fungal or actinomycetes population. The main requirement is that it should be able to grow on simpler nutrients than the test organism. An illustration of this would be the attempt to isolate a fungal mutant able to inhibit or destory *Mycobacterium tuberculosis* cells. The mutagenic fungal population is grown with a general purpose medium with ammonium salts or other mineral nitrogen salt as the sole source of nitrogen in the continuous culture unit 12 operating on the Turbidostat principle (see FIG. 6) and releasing a 5 ml. indicated by numeral 61, aliquot, at 50% maximum population density in each tube of the fraction collector. In addition, each tube receives a 15 ml. aliquot, shown by numeral 62, of the TB organisms. These are grown with Dubos broth (or other liquid medium suitable for the formation of diffuse growth of *M. tuberculosis* cells) in the continuous culture unit 13 operating on the Chemostat principle with one of the complex nitrogen nutrients as the limiting factor, asparagine, for instance.

In the tubes 16, the TB organisms are in a starvation condition and will gradually die out and autolyze, while the mutagenic population can subsist for several hours on the unused medium portion delivered to the tube at the same time as the population sample.

If no antibiotic is produced in the tube, the cloudiness due to the diffuse *M. tuberculosis* cells will subside gradually over a period of several days and a pellicle may form at the surface of the tube contents, while the fungal clumps settle quickly on the bottom of the tube and continue to grow until the nutrients present in their 5 ml. aliquot are used up. If an antibiotic is delivered in that aliquot and produced in the tube by the fungal population, a sudden decrease in the cloudiness will take place and no pellicle formation as the tubercle organisms die out or become inhibited.

From the foregoing examples, it can be seen that with the mutector device, mutants of many different kinds are rendered quickly susceptible of detection, including also those which influence the growth of free plant or animal cells.

What is claimed is:
1. A mutant detection device comprising:
   (a) a regulated movable fraction collector including a plurality of culture tubes;
   (b) a continuous culture unit for containing a body of culture medium having a large microorganism population growing therein including substantial numbers of mutants;
   (c) a container for holding a selective medium having characteristics capable of being altered by a desired mutant but not by a non-mutant;
   (d) means for repeatedly withdrawing an increment of said culture medium;
   (e) means for repeatedly withdrawing an increment of said selective medium;
   (f) means for delivering both an increment of said culture medium and an increment of said selective medium to each of said culture tubes, said increment of said selective medium being separate from said body of said culture medium;
   (g) means for regulating the rate of flow of said culture medium and said selective medium in dependence upon the speed of said fraction collector; and
   (h) means for supplying fresh culture medium to said culture unit to maintain said population.
2. The device of claim 1 further including means adjacent said culture unit for accelerating the mutation rate of said population.

References Cited
UNITED STATES PATENTS

| | | | |
|---|---|---|---|
| 2,654,522 | 10/1953 | Gorham | 23—253 |
| 2,975,553 | 3/1961 | Paul | 195—143 XR |

ALVIN E. TANENHOLTZ, *Primary Examiner.*

U.S. Cl. X.R.

195—36, 47, 80, 81, 82, 96, 100, 115, 103.5